(12) United States Patent
Bockenstette et al.

(10) Patent No.: US 8,961,356 B2
(45) Date of Patent: Feb. 24, 2015

(54) TEN SPEED TRANSMISSION WITH LATCHING MECHANISMS

(71) Applicant: GM Global Technology Operations LLC, Detroit, MI (US)

(72) Inventors: Casie M. Bockenstette, Clarkston, MI (US); Carlos E. Marin, Oxford, MI (US); Paul G. Otanez, Troy, MI (US); Craig S. Ross, Ypsilanti, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 13/921,906

(22) Filed: Jun. 19, 2013

(65) Prior Publication Data

US 2014/0378267 A1 Dec. 25, 2014

(51) Int. Cl.
*F16H 3/62* (2006.01)

(52) U.S. Cl.
CPC .......................................... *F16H 3/62* (2013.01)
USPC .......................................................... 475/275

(58) Field of Classification Search
None
See application file for complete search history.

(56) References Cited

U.S. PATENT DOCUMENTS

| | | | |
|---|---|---|---|
| 4,729,462 A | 3/1988 | Braun | |
| 6,771,031 B1 | 8/2004 | Bai | |
| 7,036,644 B2 * | 5/2006 | Stevenson et al. | 192/35 |
| 7,699,741 B2 | 4/2010 | Hart et al. | |
| 8,556,765 B2 * | 10/2013 | Bockenstette et al. | 475/275 |
| 8,585,548 B2 * | 11/2013 | Zhang et al. | 477/110 |
| 8,591,381 B2 * | 11/2013 | Zhang et al. | 477/150 |
| 8,596,440 B2 * | 12/2013 | Neelakantan et al. | 192/85.63 |
| 2005/0258013 A1 | 11/2005 | Stevenson et al. | |
| 2008/0207381 A1 | 8/2008 | Wittkopp et al. | |
| 2008/0314711 A1 | 12/2008 | Jayaram et al. | |
| 2009/0280941 A1 | 11/2009 | Dusenberry et al. | |
| 2010/0063693 A1 | 3/2010 | Lee et al. | |
| 2010/0248890 A1 | 9/2010 | Baldwin | |
| 2012/0138412 A1 * | 6/2012 | Rogner | 192/85.23 |
| 2012/0193188 A1 | 8/2012 | Neelakantan et al. | |
| 2013/0047759 A1 | 2/2013 | Bockenstette et al. | |
| 2013/0281253 A1 | 10/2013 | Ross | |
| 2013/0296093 A1 | 11/2013 | Ross | |
| 2014/0011626 A1 * | 1/2014 | Bockenstette et al. | 475/276 |

OTHER PUBLICATIONS

Farzad Samie and Chunhao Joseph Lee, Selectable One-Way Clutch in GM's RWD 6-Speed Automatic Transsmisions, SAE Int., Jan. 2009, vol. 2, Issue 1, Brice Pawley Means Industries, USA.

* cited by examiner

*Primary Examiner* — Dirk Wright

(57) ABSTRACT

A transmission is provided having an input member, an output member, four planetary gear sets, a plurality of coupling members and a plurality of torque transmitting devices. Each of the planetary gear sets includes first, second and third members. The torque transmitting devices include clutches and brakes actuatable in combinations of four to establish a plurality of forward gear ratios and one reverse gear ratio. The transmission also includes a transmission auto start/stop enabler which includes a latch mechanism. The latch mechanism readies at least one of the plurality of torque transmitting devices during an engine auto stop/start event or in preparation for a stop of the motor vehicle.

20 Claims, 3 Drawing Sheets

| GEAR STATE | RATIO STEP | CLUTCHING ELEMENTS | | | | | |
|---|---|---|---|---|---|---|---|
| | | 34 | 32 | 26 | 28 | 24 | 30 |
| 1ST | 4.70 | X | X | | | X | X |
| 1ST | 4.70 | X | X | X | | X | |
| 1ST | 4.70 | X | X | | | X | |
| 1ST | 4.70 | X | X | | X | X | |
| 2ND | 3.02 | X | X | X | X | | |
| 3RD | 2.10 | X | | X | X | X | |
| 4TH | 1.71 | X | | X | X | | X |
| 5TH | 1.49 | X | | X | | X | X |
| 6TH | 1.27 | X | | | X | X | X |
| 7TH | 1.00 | | | X | X | X | X |
| 8TH | 0.85 | | X | | X | X | X |
| 9TH | 0.70 | | X | X | | X | X |
| 10TH | 0.64 | | X | X | X | | X |
| REV | -4.53 | X | X | | X | | X |

X = ON - ENGAGED CARRYING TORQUE
O = ON - ENGAGED NOT CARRYING TORQUE

FIG. 3

TEN SPEED TRANSMISSION WITH LATCHING MECHANISMS

FIELD

The invention relates generally to a multiple speed transmission having a plurality of planetary gear sets and a plurality of torque transmitting devices and more particularly to a transmission having ten speeds, four planetary gear sets and one or a plurality of torque transmitting devices with latching mechanisms to enable automatic engine start/stop.

BACKGROUND

The statements in this section merely provide background information related to the present disclosure and may or may not constitute prior art.

A typical automatic transmission includes a hydraulic control system that, among other functions, is employed to actuate a plurality of torque transmitting devices and to provide lubrication and cooling to the components of the transmission. The conventional hydraulic control system typically includes a main pump that provides a pressurized fluid, such as automatic transmission oil, to a plurality of valves and solenoids within a valve body. The main pump is driven by the engine of the motor vehicle. The valves and solenoids are operable to direct the pressurized hydraulic fluid through a hydraulic fluid circuit to the components of the transmission. For example the pressurized hydraulic fluid delivered to the torque transmitting devices is used to engage or disengage the devices in order to obtain different gear ratios.

In order to increase the fuel economy of motor vehicles, it is desirable to stop the engine during certain circumstances, such as when stopped at a red light or idling. However, during this automatic stop, the pump is no longer driven by the engine. Accordingly, hydraulic fluid pressure within the hydraulic control system drops. This leads to clutches and/or brakes within the transmission to be fully disengaged. As the engine restarts, these clutches and/or brakes may take time to reengage fully, thereby producing slippage and delay between engagement of the accelerator pedal or release of the brake and the movement of the motor vehicle. Therefore, there is a need in the art for an automatic transmission enabled for engine stop-start events such that the automatic start/stop event does not affect transmission operating performance.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes. The transmission includes an engine automatic start/stop enabler.

In one example of the present invention, the transmission includes an input member, an output member, first, second, third and fourth planetary gear sets each having first, second and third members, and six torque transmitting mechanisms selectively engageable to interconnect one of the first, second, and third members with at least one other of the first members, second members, third members and a stationary member. The torque transmitting mechanisms are selectively engageable in combinations of at least four to establish at least ten forward speed ratios and at least one reverse speed ratio between the input member and the output member. A first latching mechanism is connected to a third of the six torque transmitting mechanisms, wherein the first latching mechanism latches the third torque transmitting mechanism in a ready state. The ready state refers to various states or conditions of the clutch may include a filled state where oil is fed to the circuits that actuate the clutch, a staged state where the clutch has been moved to near full engagement, and an engaged state where the clutch is fully engaged and ready to transmit torque, or any other state in between. A second latching mechanism is connected to a fifth of the six torque transmitting mechanisms, wherein the second latching mechanism latches the fifth torque transmitting mechanism in the ready state. A third latching mechanism is connected to a sixth of the six torque transmitting mechanisms, wherein the third latching mechanism latches the sixth torque transmitting mechanism in the ready state. One, two, or all of the third, fifth, and sixth torque transmitting mechanisms are in the ready state during a first forward gear.

In another example of the present invention, the third, fifth, and sixth torque transmitting mechanisms are in the ready state during a reverse gear.

In yet another example of the present invention, the first latching mechanism latches the third torque transmitting device during a startup of the motor vehicle after an automatic engine stop event or in preparation for a stop of the motor vehicle, the second latching mechanism latches the fifth torque transmitting device during the automatic startup of the motor vehicle after the automatic engine stop event or in preparation for a stop of the motor vehicle, and the third latching mechanism latches the sixth torque transmitting device during the startup of the motor vehicle after the automatic engine stop event or in preparation for a stop of the motor vehicle.

In yet another example of the present invention, the first, second, and third latching mechanisms are hydraulic latching mechanisms.

In yet another example of the present invention, the first, second, and third latching mechanisms are mechanical latching mechanisms that are each mechanically coupled to one of the third, fifth, and sixth torque transmitting mechanisms.

In yet another example of the present invention, the transmission includes a first interconnecting member continuously interconnecting the first member of the first planetary gear set with the first member of the second planetary gear set, a second interconnecting member continuously interconnecting the second member of the first planetary gear set with the third member of the fourth planetary gear set, a third interconnecting member continuously interconnecting the first member of the third planetary gear set with the third member of the second planetary gear set, and a fourth interconnecting member continuously interconnecting the third member of the third planetary gear set with the first member of the fourth planetary gear set.

In yet another example of the present invention, a first of the six torque transmitting mechanisms is selectively engageable to interconnect the input member and the second member of the second planetary gear set with the first member of the fourth planetary gear set and the third member of the third planetary gear set.

In yet another example of the present invention, a second of the six torque transmitting mechanisms is selectively engageable to interconnect the third member of the second planetary gear set and the first member of the third planetary gear set with a freely rotatable member.

In yet another example of the present invention, the third of the six torque transmitting mechanisms is selectively engageable to interconnect the second member of the third planetary gear set with the freely rotatable member.

In yet another example of the present invention, a fourth of the six torque transmitting mechanisms is selectively engageable to interconnect the second member of the first planetary gear set and the third member of the fourth planetary gear set with the freely rotatable member.

In yet another example of the present invention, the fifth of the six torque transmitting mechanisms is selectively engageable to interconnect the first member of the first planetary gear set and the first member of the second planetary gear set with the stationary member.

In yet another example of the present invention, the sixth of the six torque transmitting mechanisms is selectively engageable to interconnect the third member of the first planetary gear set with the stationary member.

In yet another example of the present invention, the first members of the first, second, third and fourth planetary gear sets are sun gears, the second members of the first, second, third and fourth planetary gear sets are carrier members and the third members of the first, second, third and fourth planetary gear sets are ring gears.

In yet another example of the present invention, the input member is continuously interconnected with the second member of the second planetary gear set and wherein the output member is continuously interconnected with the second member of the fourth planetary gear set.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting elements in each of the available forward and reverse speeds or gear ratios of the transmissions illustrated in FIGS. 1 and 2.

DETAILED DESCRIPTION

The following description is merely exemplary in nature and is not intended to limit the present disclosure, application, or uses.

Figure 1:
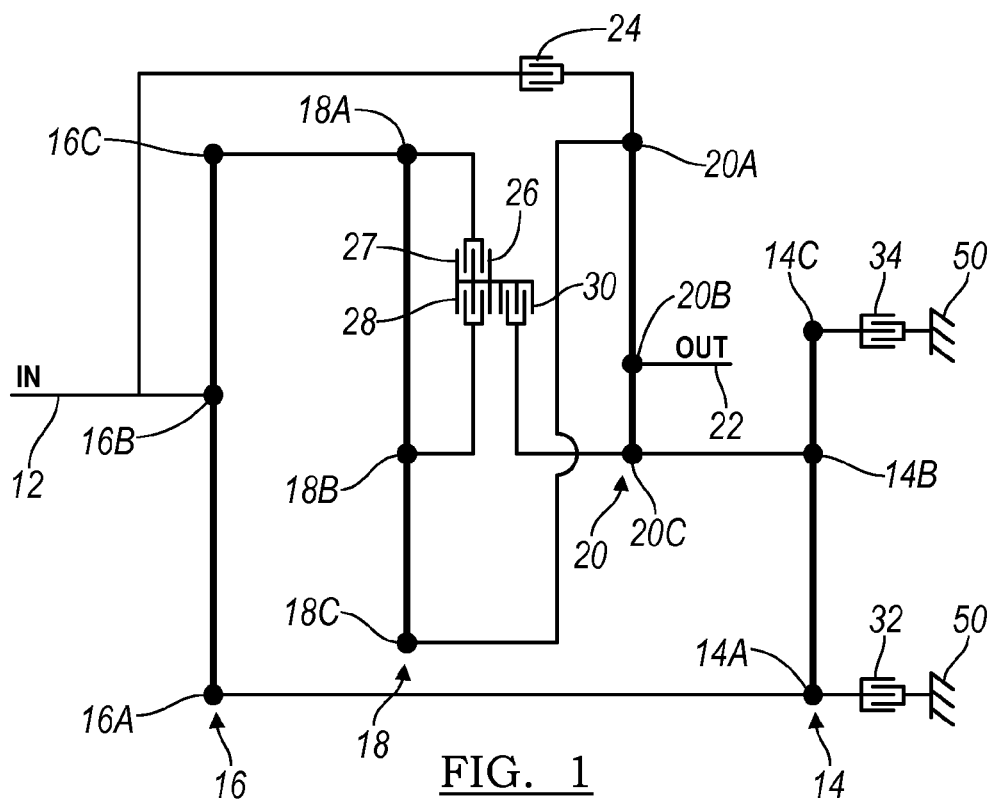
FIG. 1 is a lever diagram of a ten speed transmission according to the principles of the present invention.

Referring now to FIG. 1, an embodiment of a ten speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18 and a fourth planetary gear set 20 and an output shaft or member 22. The first planetary gear set 14 has three nodes: a first node 14A, a second node 14B and a third node 14C. The second planetary gear set 16 has three nodes: a first node 16A, a second node 16B and a third node 16C. The third planetary gear set 18 has three nodes: a first node 18A, a second node 18B and a third node 18C. The fourth planetary gear set 20 has three nodes: a first node 20A, a second node 20B and a third node 20C.

The input member 12 is continuously coupled to the second node 16B of the second planetary gear set 16. The output member 22 is coupled to the second node 20B of the fourth planetary gear set 20. The first node 14A of the first planetary gear set 14 is coupled to the first node 16A of the second planetary gear set 16. The second node 14B of the first planetary gear set 14 is coupled to the third node 20C of the fourth planetary gear set 20. The third node 16C of the second planetary gear set 16 is coupled to the first node 18A of the third planetary gear set 18. The third node 18C of the third planetary gear set 18 is coupled to the first node 20A of the fourth planetary gear set 20.

A first clutch 24 selectively connects the second node 16B of the second planetary gear set 16 and the input member or shaft 12 with the third node 18C of the third planetary gear set and the first node 20A of the fourth planetary gear set 20. A second clutch 26 selectively connects the third node 16C of the second planetary gear set 16 and the first node 18A of the third planetary gear set 18 with a rotating member 27. The rotating member 27 is supported for rotation within the transmission 10. A third clutch 28 selectively connects the second node 18B of the third planetary gear set with the rotating member 27. A fourth clutch 30 selectively connects the rotating member 27 with the third node 20C of the fourth planetary gear set and the second node 14B of the first planetary gear set 14. A first brake 32 selectively connects the first node 14A of the first planetary gear set 14 and the first node 16A of the second planetary gear set 16 with a stationary member or transmission housing 40. A second brake 34 selectively connects the third node 14C of the first planetary gear set 14 with another stationary member or the transmission housing 40.

Figure 2:
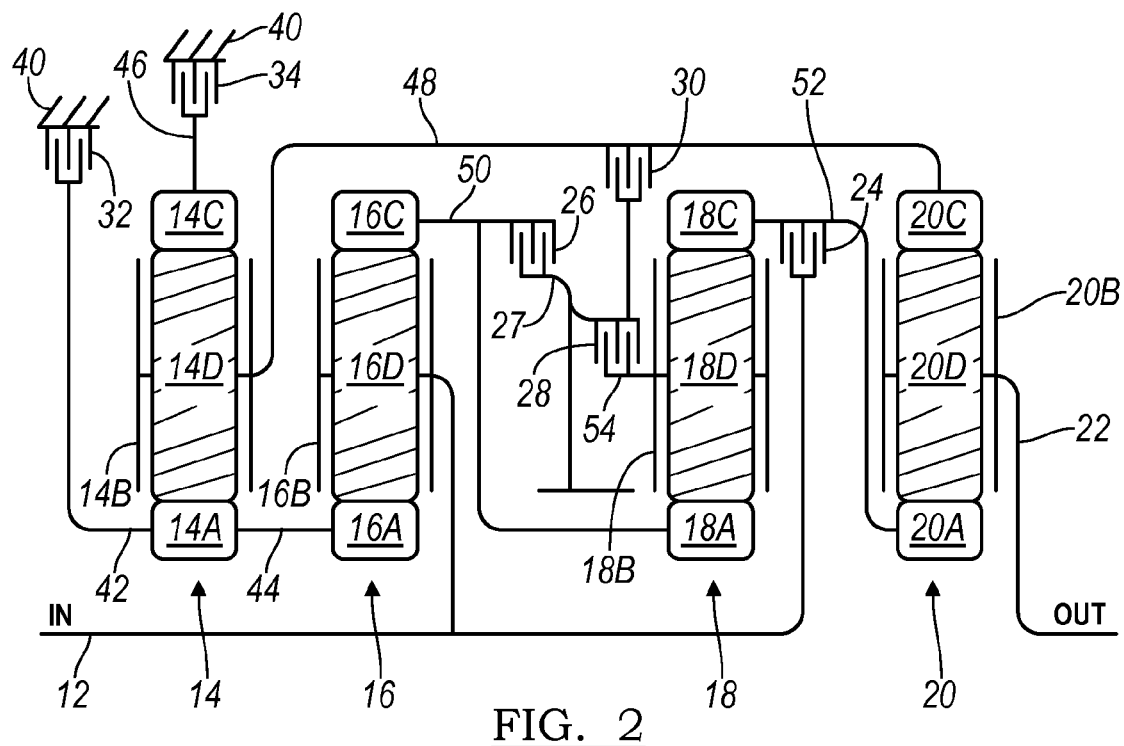
FIG. 2 is a diagrammatic illustration of an embodiment of a ten speed transmission according to the principles of the present invention.

Referring now to FIG. 2, a stick diagram presents a schematic layout of an embodiment of the ten speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers. In an embodiment of the present invention, the four planetary gear sets 14, 16, 18 and 20 are simple planetary gear sets, as described below. However, the present invention contemplates other embodiments that replace the simple planetary gear sets with all or a combination of compound planetary gear sets having two or more sets of planet pinions supported by a single carrier member.

For example, the planetary gear set 14 includes a sun gear member 14A, a ring gear member 14C and a planet gear carrier member 14B that rotatably supports a set of planet gears 14D (only one of which is shown). The sun gear member 14A is connected for common rotation with a first shaft or interconnecting member 42 and a second shaft or interconnecting member 44. The ring gear member 14C is connected for common rotation with a third shaft or interconnecting member 46. The planet carrier member 14B is connected for common rotation with a fourth shaft or interconnecting member 48. The planet gears 14D are each configured to intermesh with both the sun gear member 14A and the ring gear member 14C.

The planetary gear set 16 includes a sun gear member 16A, a ring gear member 16C and a planet gear carrier member 16B that rotatably supports a set of planet gears 16D (only one of which is shown). The sun gear member 16A is connected for common rotation with the second interconnecting member 44. The ring gear member 16C is connected for common rotation with a fifth shaft or interconnecting member 50. The planet carrier member 16B is connected for common rotation with the input member 12. The planet gears 16D are each configured to intermesh with both the sun gear member 16A and the ring gear member 16C.

The planetary gear set 18 includes a sun gear member 18A, a ring gear member 18C and a planet gear carrier member 18B that rotatably supports a set of planet gears 18D (only one of which is shown). The sun gear member 18A is connected for common rotation with the fifth interconnecting member 50. The ring gear member 18C is connected for common rotation with a sixth shaft or interconnecting member 52. The planet carrier member 18B is connected for common rotation with a seventh shaft or interconnecting member 54. The planet gears 18D are each configured to intermesh with both the sun gear member 18A and the ring gear member 18C.

The planetary gear set 20 includes a sun gear member 20A, a ring gear member 20C and a planet gear carrier member 20B that rotatably supports the set of stepped planet gears 18D (only one of which is shown). The sun gear member 20A is connected for common rotation with the seventh interconnecting member 52. The ring gear member 20C is connected for common rotation with the fourth interconnecting member 48. The planet carrier member 20B is connected for common rotation with the output member 22. The planet gears 20D are each configured to intermesh with both the sun gear member 20A and the ring gear member 20C.

The torque-transmitting mechanisms or clutches 24, 26, 28, 30 and brakes 32, 34 allow for selective interconnection of the shafts or interconnecting members, members of the planetary gear sets and the housing. The clutches 24, 26, 28, 30 and brakes 32, 34 are friction, dog or synchronizer type mechanisms or the like. For example, the first clutch 24 is selectively engageable to connect the input shaft or member 12 with the sixth shaft or interconnecting member 52. The second clutch 26 is selectively engageable to connect the fifth interconnecting member 50 with the rotatable member 27. The third clutch 28 is selectively engageable to connect the seventh shaft or interconnecting member 54 with the rotatable member 27. The fourth clutch 30 is selectively engageable to connect the fourth interconnecting member 48 with the rotatable member 27. The first brake 32 is selectively engageable to connect the first shaft or interconnecting member 42 with the stationary element or the transmission housing 40 in order to restrict the member 42 from rotating relative to the transmission housing 40. The second brake 34 is selectively engageable to connect the third shaft or interconnecting member 46 with the stationary element or the transmission housing 40 in order to restrict the member 46 from rotating relative to the transmission housing 40.

Referring now to FIG. 2 and FIG. 3, the operation of the ten speed transmission 10 will be described. It will be appreciated that transmission 10 is capable of transmitting torque from the input shaft or member 12 to the output shaft or member 22 in at least ten forward speed or torque ratios and at least one reverse speed or torque ratio. Each forward and reverse speed or torque ratio is attained by engagement of four of the torque-transmitting mechanisms, as will be explained below. FIG. 3 is a truth table that presents the various combinations of torque-transmitting mechanisms that are activated or engaged to achieve the various gear states. An "X" in the box means that the particular referenced clutch or brake is engaged to achieve the desired gear state. In addition, multiple means of engaging a first gear ratio are shown. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

With specific reference to FIG. 3, the truth table is presented illustrating a state of engagement of the various torque transmitting elements in each of the available forward and reverse speeds or gear ratios of the transmission 10. For example, a reverse gear is established through the engagement or activation of the clutches 28 and 30 as well as brakes 32 and 34. Likewise, the ten forward ratios are achieved through different combinations of clutch and brake engagement, as shown in FIG. 3.

Figure 4:
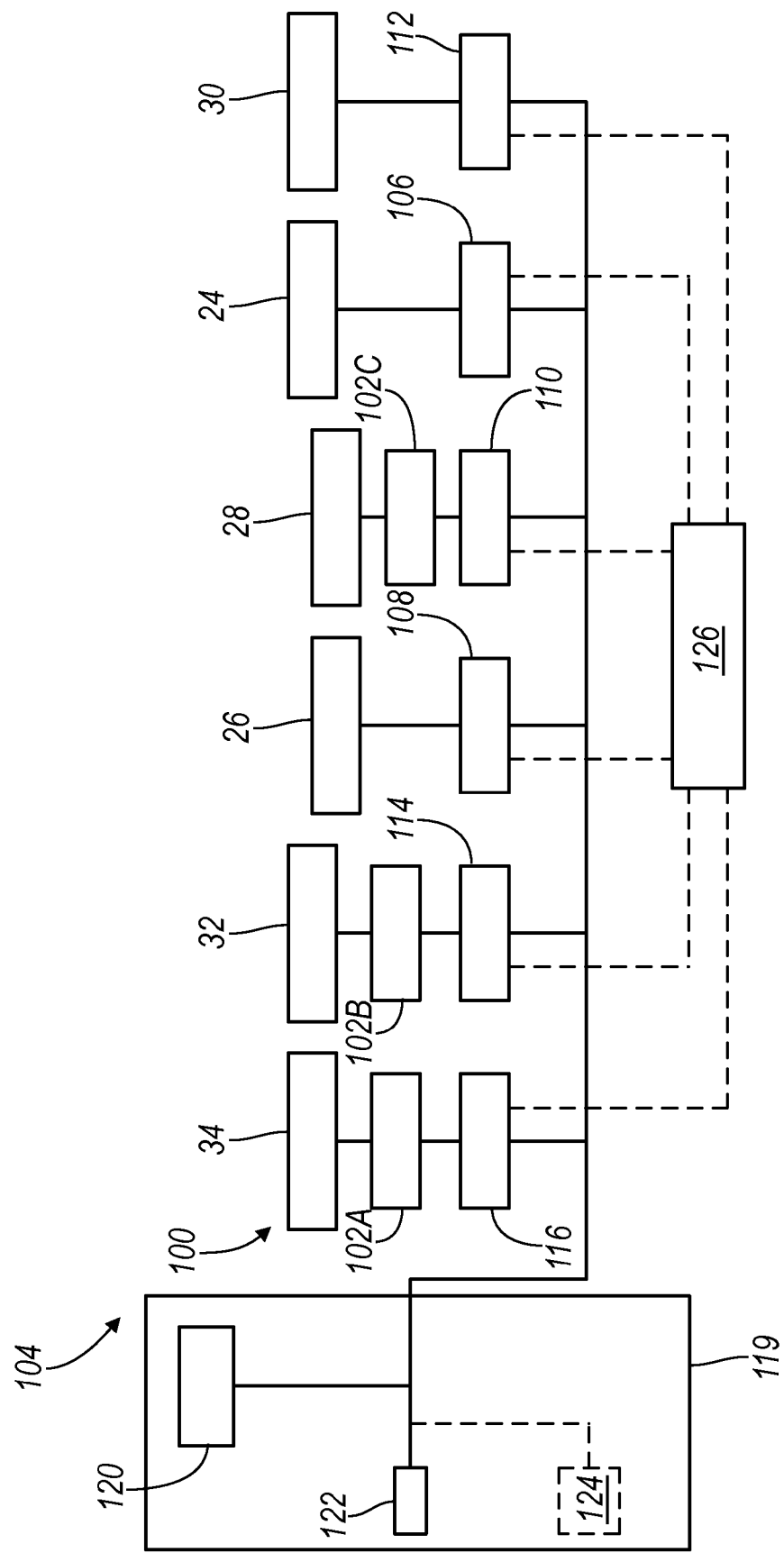
FIG. 4 is a block diagram of the transmission with an engine start/stop enabler.

Turning to FIG. 4, the transmission 10 includes an engine start/stop enabler system 100 that includes one or more of locking or latching mechanisms 102A, 102B, and 102C associated with a subset of the torque transmitting mechanisms 24, 26, 28, 30, 32, and 34. In the example provided, a first latching mechanism 102A is connected with the second brake 34, a second latching mechanism 102B is connected with the first brake 32, and a third latching mechanism 102C is connected with the third clutch 28 or the first brake 30. The locking mechanisms 102A-C can be any suitable mechanism that places the respective clutch or brake, such as, for example, those described below in a ready state. The ready state refers to various states or conditions of the clutch or brake that may include a filled state where oil is fed to the circuits that actuate the clutch, a staged state where the clutch has been moved to near full engagement, and an engaged state where the clutch is fully engaged and ready to transmit torque, or any other state in between. The transmission also includes a hydraulic control system 104 with a first solenoid 106, a second solenoid 108, a third solenoid 110, a fourth solenoid 112, a fifth solenoid 114, and a sixth solenoid 116. In one embodiment the solenoids 106, 108, 110, 112, 114, 116, and 118 are variable force solenoids. In the particular arrangement shown in FIG. 4, the first solenoid 106 is in selective fluid communication with the first clutch 24. The second solenoid 108 is in selective fluid communication with the second clutch 26. The third solenoid 110 is in selective fluid communication with the third clutch 28. The fourth solenoid 112 is in selective fluid communication with the first brake 30. The fifth solenoid 114 is in selective fluid communication with the second brake 32. The sixth solenoid 116 is in selective fluid communication with the third brake 34.

It should be appreciated that the hydraulic control system 104 may include various other systems, modules, solenoids, etc., without departing from the scope of the present invention. For example, in various arrangements, the hydraulic control system 104 includes variable bleed solenoids or on/off devices or any other suitable devices to selectively engage the torque transmitting mechanisms 24, 26, 28, 30, 32, 34 by selectively communicating hydraulic fluid to the various torque transmitting mechanisms.

The solenoids 106, 108, 110, 112, 114, 116 are provided pressurized hydraulic fluid by a pressure regulator subsystem 119 that includes an engine driven pump 120 and/or an accumulator 122. The engine driven pump 120 communicates with the solenoids 106, 108, 110, 112, 114, 116. Alternatively the transmission 10 may include a second, auxiliary pump 124 in communication with the solenoids 106, 108, 110, 112, 114, 116. The pressure regulator subsystem 119 including the pump 120 and accumulator 122 or auxiliary pump 124, as well as the solenoids 106, 108, 110, 112, 114, 116, receive instructions from a controller 126. The controller 126 may be a transmission control module (TCM), an engine control module (ECM), or a hybrid control module, or any other type of controller. The controller 126 is preferably an electronic control device having a preprogrammed digital computer or processor, control logic, memory used to store data, and at least one I/O peripheral. The control logic includes a plurality of logic routines for monitoring, manipulating, and generating data.

When the motor vehicle comes to a stop an auto stop event may occur where the engine 79 is automatically turned off. During the auto start when the engine 79 is turned back on and the motor vehicle begins to move, the motor vehicle typically starts again in first or reverse gear. That is, the torque transmitting mechanisms 28, 30, 32, 34 are engaged for reverse gear; or torque transmitting mechanisms 24, 28, 32, 34 are engaged for first gear. However, during the auto stop, the main pump 120 is no longer supplying pressure to the clutches and brakes. Accordingly, when the motor vehicle is ready to start again and the locking mechanisms 102A-C are not employed, the transmission pump 120 is generally required to pump sufficient pressure to four of the torque transmitting mechanisms depending on which gear has been commanded. Sufficient pressure is preferably provided so that the torque transmitting mechanisms can be quickly engaged without lag when the vehicle starts again. Likewise the accumulator 122 is sized to provide sufficient fluid volume and flow, as moderated by respective solenoids 106, 108, 110, 112, 114, 116 to the torque transmitting mechanisms depending on which gear has been commanded. Alternatively, the auxiliary pump 124 can be employed in place of the accumulator 122 to provide the appropriate hydraulic fluid pressure to the devices in the hydraulic control system 104 to selectively engage the torque transmitting mechanisms 24, 26, 28, 30, 32, 34. In some arrangements a combination of two or all of the transmission pump 120, the accumulator 122, and the auxiliary pump 124 provides flow to the torque transmitting mechanisms.

With the implementation of the automatic start/stop enabler system 100 the brakes 32 and 34 can be considered a holding brake and the clutch 28 a holding clutch. That is, prior to or at a start event, the locking mechanisms 102A-C are activated to engage the brakes 32, 34 and the clutch 28. As such, the transmission pump 120 or the accumulator 122 or the auxiliary pump 124 only has to provide sufficient pressure or sufficient volume of hydraulic fluid to engage one of the remaining torque transmitting mechanisms 24 and 30 for first or reverse gear, respectively. Hence, with the use of the locking mechanisms 102A-C, the transmission pump 120 or the accumulator 122 or the auxiliary pump 124 is required to provide pressure or fluid volume for one torque transmitting mechanism for a start event, whereas without the locking mechanism 102, the transmission pump 120 or the accumulator 122 or the auxiliary pump 124 is required to provide pressure or fluid volume for four torque transmitting mechanisms for a start event.

The locking mechanisms 102A-C are directly coupled to the brakes 32, 34 and clutch 28 and can be a mechanical latch or hydraulic latch or any other suitable mechanism and which can be under the control of the controller 126. For example, locking mechanisms are described in, but are not limited to, U.S. patent application Ser. No. 13/857,429 filed Apr. 5, 2013, and U.S. patent application Ser. No. 13/867,495 filed Apr. 23, 2013, the contents of which are incorporated herein by reference in their entirety.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission in a motor vehicle, the transmission comprising:
    an input member;
    an output member;
    first, second, third and fourth planetary gear sets each having first, second and third members;
    six torque transmitting mechanisms selectively engageable to interconnect one of the first, second, and third members with at least one other of the first members, second members, third members and a stationary member, wherein the torque transmitting mechanisms are selectively engageable in combinations of at least four to establish at least ten forward speed ratios and at least one reverse speed ratio between the input member and the output member; and
    at least one of a first latching mechanism connected to a third of the six torque transmitting mechanisms, wherein the latching mechanism latches the third torque transmitting mechanism in engaged ready state, a second latching mechanism connected to a fifth of the six torque transmitting mechanisms, wherein the latching mechanism latches the fifth torque transmitting mechanism in the ready state, and a third latching mechanism connected to a sixth of the six torque transmitting mechanisms, wherein the latching mechanism latches the sixth torque transmitting mechanism in the ready state,
    wherein the third, fifth, and sixth torque transmitting mechanisms are in the ready state during a first forward gear.

2. The transmission of claim 1 wherein the third, fifth, and sixth torque transmitting mechanisms are in the ready state during a reverse gear.

3. The transmission of claim 1 wherein the first latching mechanism latches the third torque transmitting device for preparation for an engine stop event, the second latching mechanism latches the fifth torque transmitting device for preparation for the engine stop event, and the third latching mechanism latches the sixth torque transmitting device for preparation for an engine stop event.

4. The transmission of claim 1 wherein at least one of the first, second, and third latching mechanisms are hydraulic latching mechanisms.

5. The transmission of claim 1 wherein at least one of the first, second, and third latching mechanisms are mechanical latching mechanisms that are each mechanically coupled to one of the third, fifth, and sixth torque transmitting mechanisms.

6. The transmission of claim 1 further comprising:
a first interconnecting member continuously interconnecting the first member of the first planetary gear set with the first member of the second planetary gear set;
a second interconnecting member continuously interconnecting the second member of the first planetary gear set with the third member of the fourth planetary gear set;
a third interconnecting member continuously interconnecting the first member of the third planetary gear set with the third member of the second planetary gear set; and
a fourth interconnecting member continuously interconnecting the third member of the third planetary gear set with the first member of the fourth planetary gear set.

7. The transmission of claim 6 wherein a first of the six torque transmitting mechanisms is selectively engageable to interconnect the input member and the second member of the second planetary gear set with the first member of the fourth planetary gear set and the third member of the third planetary gear set.

8. The transmission of claim 7 wherein a second of the six torque transmitting mechanisms is selectively engageable to interconnect the third member of the second planetary gear set and the first member of the third planetary gear set with a freely rotatable member.

9. The transmission of claim 8 wherein the third of the six torque transmitting mechanisms is selectively engageable to interconnect the second member of the third planetary gear set with the freely rotatable member.

10. The transmission of claim 9 wherein a fourth of the six torque transmitting mechanisms is selectively engageable to interconnect the second member of the first planetary gear set and the third member of the fourth planetary gear set with the freely rotatable member.

11. The transmission of claim 10 wherein the fifth of the six torque transmitting mechanisms is selectively engageable to interconnect the first member of the first planetary gear set and the first member of the second planetary gear set with the stationary member.

12. The transmission of claim 11 wherein the sixth of the six torque transmitting mechanisms is selectively engageable to interconnect the third member of the first planetary gear set with the stationary member.

13. The transmission of claim 1 wherein the first members of the first, second, third and fourth planetary gear sets are sun gears, the second members of the first, second, third and fourth planetary gear sets are carrier members and the third members of the first, second, third and fourth planetary gear sets are ring gears.

14. The transmission of claim 1 wherein the input member is continuously interconnected with the second member of the second planetary gear set and wherein the output member is continuously interconnected with the second member of the fourth planetary gear set.

15. A transmission in a motor vehicle, the transmission comprising:
an input member;
an output member;
first, second, third and fourth planetary gear sets each having first, second and third members;
a first interconnecting member continuously interconnecting the first member of the first planetary gear set with the first member of the second planetary gear set;
a second interconnecting member continuously interconnecting the second member of the first planetary gear set with the third member of the fourth planetary gear set;
a third interconnecting member continuously interconnecting the first member of the third planetary gear set with the third member of the second planetary gear set;
a fourth interconnecting member continuously interconnecting the third member of the third planetary gear set with the first member of the fourth planetary gear set;
a first torque transmitting mechanism selectively engageable to interconnect the input member and the second member of the second planetary gear set with the first member of the fourth planetary gear set and the third member of the third planetary gear set;
a second torque transmitting mechanism selectively engageable to interconnect the third member of the second planetary gear set and the first member of the third planetary gear set with a freely rotatable member;
a third torque transmitting mechanism selectively engageable to interconnect the second member of the third planetary gear set with the freely rotatable member;
a fourth torque transmitting mechanism selectively engageable to interconnect the second member of the first planetary gear set and the third member of the fourth planetary gear set with the freely rotatable member;
a fifth torque transmitting mechanism selectively engageable to interconnect the first member of the first planetary gear set and the first member of the second planetary gear set with the stationary member;
a sixth torque transmitting mechanism selectively engageable to interconnect the third member of the first planetary gear set with the stationary member;
a first latching mechanism connected to the third torque transmitting mechanism, wherein the latching mechanism latches the third torque transmitting mechanism in a ready state;
a second latching mechanism connected to the fifth torque transmitting mechanism, wherein the latching mechanism latches the fifth torque transmitting mechanism in the ready state; and
a third latching mechanism connected to the sixth torque transmitting mechanism, wherein the latching mechanism latches the sixth torque transmitting mechanism in the ready state,
wherein the torque transmitting mechanisms are selectively engageable in combinations of at least four to establish at least ten forward speed ratios and at least one reverse speed ratio between the input member and the output member, and
wherein the third, fifth, and sixth torque transmitting mechanisms are in the ready state during a first forward gear.

16. The transmission of claim 15 wherein the third, fifth, and sixth torque transmitting mechanisms are in the ready state during a reverse gear.

17. The transmission of claim 15 wherein the first latching mechanism latches the third torque transmitting device in preparation for an engine stop event of the motor vehicle, the second latching mechanism latches the fifth torque transmitting device in preparation for the engine stop event of the motor vehicle, and the third latching mechanism latches the sixth torque transmitting device in preparation for the engine stop event of the motor vehicle.

18. The transmission of claim 15 wherein the first, second, and third latching mechanisms are hydraulic latching mechanisms.

19. The transmission of claim 15 the first, second, and third latching mechanisms are mechanical latching mechanisms that are each mechanically coupled to one of the third, fifth, and sixth torque transmitting mechanisms.

20. A transmission in a motor vehicle, the transmission comprising:
   an input member;
   an output member;
   first, second, third and fourth planetary gear sets each having first, second and third members;
   six torque transmitting mechanisms selectively engageable to interconnect one of the first, second, and third members with at least one other of the first members, second members, third members and a stationary member, wherein the torque transmitting mechanisms are selectively engageable in combinations of at least four to establish at least ten forward speed ratios and at least one reverse speed ratio between the input member and the output member;
   a first latching mechanism connected to a third of the six torque transmitting mechanisms, wherein the latching mechanism latches the third torque transmitting mechanism in a ready state in preparation for an automatic engine stop/start event;
   a second latching mechanism connected to a fifth of the six torque transmitting mechanisms, wherein the latching mechanism latches the fifth torque transmitting mechanism in the ready state in preparation for the automatic engine stop/start event; and
   a third latching mechanism connected to a sixth of the six torque transmitting mechanisms, wherein the latching mechanism latches the sixth torque transmitting mechanism in the ready state in preparation for the automatic engine stop/start event,
   wherein the third, fourth, and fifth torque transmitting mechanisms are selected from a group consisting of three brakes and one clutch.

* * * * *